(No Model.)

M. ROUSE.
DIE FOR CUTTING SCREW THREADS.

No. 542,006. Patented July 2, 1895.

Witnesses
Inventor
Michael Rouse
by his Attorney

UNITED STATES PATENT OFFICE.

MICHAEL ROUSE, OF LOPEZ, PENNSYLVANIA.

DIE FOR CUTTING SCREW-THREADS.

SPECIFICATION forming part of Letters Patent No. 542,006, dated July 2, 1895.

Application filed December 26, 1894. Serial No. 532,992. (No model.)

*To all whom it may concern:*

Be it known that I, MICHAEL ROUSE, a citizen of the United States, residing at Lopez, in the county of Sullivan and State of Pennsylvania, have invented certain new and useful Improvements in Dies for Cutting Screw-Threads; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to dies for cutting screw-threads on pipes or tubes, bolts, and the like; and it has for its object to provide a die of an improved construction, adapting it to a wider range of usefulness, and provided with an auxiliary or supplemental cutter of materially smaller size than the main cutter and adapted when not being used for cutting threads to receive a screw to limit the compression of the main cutter or retain it to its adjustment.

It has further for its object to provide an improved guide attachment for centering or guiding the tube or bolt on which the threads are to be cut.

It has also for its object to simplify the construction of the tool and to increase its efficiency.

To the accomplishment of the foregoing and such other objects as may hereinafter appear the invention consists in the construction and the combination of parts hereinafter particularly described and then sought to be specifically defined by the claims, reference being had to the accompanying drawings, forming a part hereof, and in which—

Figure 1:
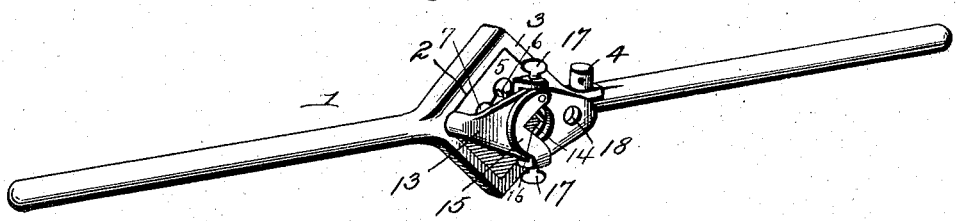
Figure 2:
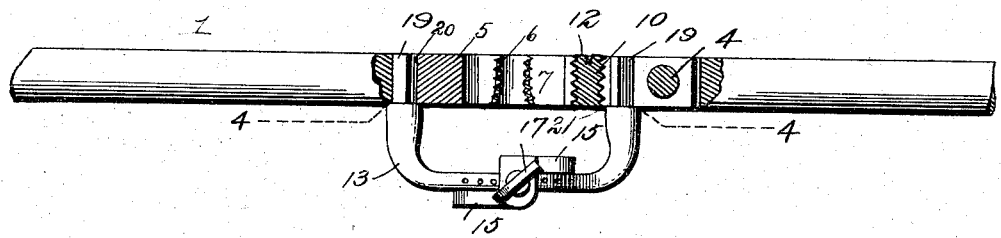
Figures 3, 5:
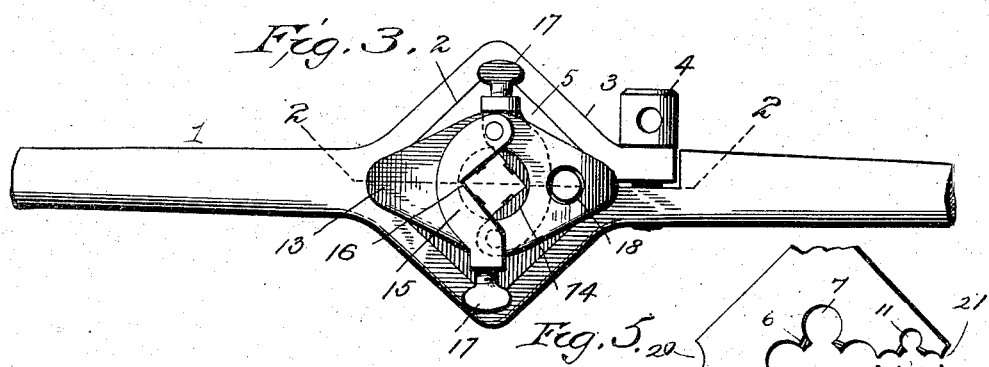
Figure 4:
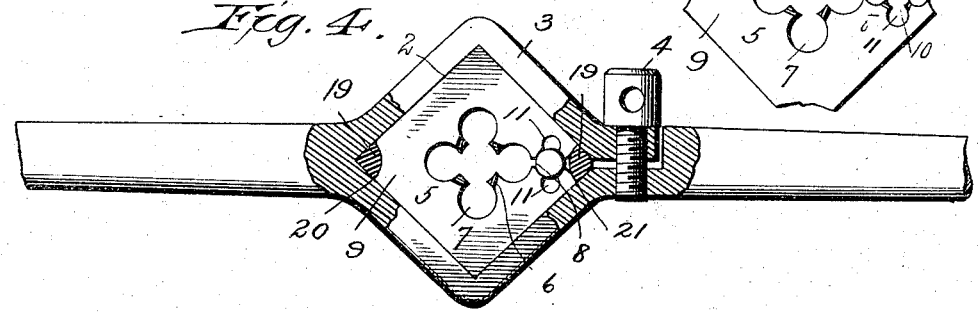

Figure 1 is a perspective of the die-stock, containing the die and the guide; Fig. 2, a sectional view thereof on the line 2 2 of Fig. 3, the guide being in full lines. Fig. 3 is a bottom plan view of the stock, die, and guide. Fig. 4 is a sectional view taken on the line 4 4 of Fig. 2. Fig. 5 is a detail view illustrating a modified form of die in which the auxiliary cutter is provided with four clearances.

In the drawings, the numeral 1 designates the die-stock, formed with the central angular opening 2 to receive the die, one side wall of said opening constituting a clamping-arm 3, the end of which receives a threaded bolt or screw 4, which enters a portion of the stock opposite the end of said clamping-arm, so that by tightening the screw or bolt the die will be securely clamped in the opening 2.

The die 5 is angular in outline, corresponding to the shape of the opening 2. It is formed with the internal cutting-threads 6 to cut the threads on the tube, screw, or bolt which is to have the threads formed thereon, and it is formed with the usual clearances 7. It will be observed that the cutting-threads 6 6 extend from the top clear to the base of the die and that the lower portion of the threaded opening flares, the cutting-threads extending to the base of the cutting portion. The purpose of this is to adapt the cutting-threads to take hold of the tube or bolt at the extreme end where it first enters the threaded opening, so that the threads will be cut on the tube or bolt from its extreme end or point backwardly, the first thread of the cutter taking out only a portion of the metal wherein the threads are cut and the succeeding threads of the cutter taking out more of the metal, so as to give the proper depth to the threads. This enables a longer thread to be cut on the tube or bolt and forms a more perfect thread at the extreme end or point of the tube or bolt.

The die is split from one of the clearances 7 to one corner of the die, as shown at 8, and the die at the opposite corner 9 is so tempered as to form spring metal at that corner, so that the split corner 8 will normally stand open, and thus allow the die to be compressed by the clamping-arm 3, so as to bring the cutting-threads of the main cutter to the gage desired by compression of the die. In the split corner of the die is formed an auxiliary or supplemental cutter 10, the threads of which extend from the top to the base of the die, said cutter intersecting the split opening 8. This cutter is provided with the clearances 11. The cutter is of materially smaller size than the main cutter 6, so as to adapt the die to cut threads of a smaller gage than the main cutter is capable of cutting. When the cutter 10 is not being used for cutting threads, it is adapted to receive a screw 12 to restrict or limit the gage of the cutter 6 after the latter has been compressed to bring it to the gage desired.

The stock is provided with a guide 13 for guiding and centering the pipe or bolt while having the threads cut thereon. This guide is formed in its base with an opening 14 for the passage of the pipe or bolt or rod on which the threads are cut. To this guide on opposite sides of the opening 14 are pivoted jaws 15, which have angular faces 16, adapted to bear against the surface of the tube or bolt to be threaded. These jaws swing to and from each other, so as to adapt them to different diameters of pipes or bolts, and they are held to their adjustment by set-screws 17, whose points will bear against the sides of the guide 13, so as to hold the jaws to their adjustments. The jaws preferably lie on opposite sides of the guides—that is, one across the top and the other across the bottom of the guide. These jaws, however, can be omitted without departing from the other features of the invention; but it is preferred to use them. The guide is also provided with an opening 18, in register with the supplemental or auxiliary cutter 10, so as to guide the rods or bolts that may be threaded by that cutter. The ends or shanks 19 of the guide fit in recesses 20 and 21, formed in opposite corners of the die, and bear partly against the die where those recesses are formed and partly against the adjacent portions of the die-stock, as illustrated. When the screw or bolt 4 is tightened to clamp the die in place, it at the same time clamps the guide in place, and when the screw or bolt is loosened the guide can be readily slipped out of place, so that it can be removed if it is desired to have the die work close to the face of any object in the operation of forming a screw-thread. It will be observed that the recess 21 flares or diverges from the auxiliary or supplemental cutter 10 or from the split opening 8, which intersects that cutter. This feature of construction permits the split corner of the die to be compressed or its separated portions brought toward each other back of the shank at that corner of the die when the clamping-arm 3 is pressed down by the screw or bolt 4. During this operation the pressure upon the opposite faces of the die at the corner will have a tendency to force the shank slightly to one side, which will be permitted by the space between the narrow portion of the shank and the separated portion of the stock where the screw or bolt 4 is located.

This die in operation has proved very efficient and found to possess the advantages claimed for the various parts of the construction.

I have described with particularity the details of the several parts; but it is obvious that changes can be made therein without departing from the essential features of the invention.

The supplemental or auxiliary cutter 10 formed in the split corner of the die may be provided with four clearances 11, as shown in Fig. 5, so as to quickly clear the die of the metallic cuttings formed by the thread-cutters.

Having described my invention and set forth its merits, what I claim is—

1. The die for cutting screw threads having the main thread cutter portion formed in the central portion of the die, and the auxiliary thread cutter portion formed in one corner of the die, the thread cutters of both portions extending from the top to the base of the die, the corner where the auxiliary cutter is located being split and formed with diverging sides and the opposite corner formed of spring metal to normally expand the die and having a recess at opposite corners adapted to receive the shanks of a guide, substantially as and for the purposes described.

2. In a die for cutting screw threads having the main thread cutter portion, and the auxiliary thread cutter portion of smaller diameter than the main cutter portion, the corner of the die where the auxiliary thread cutter portion is located being split and the opposite corner formed of spring metal whereby the die will normally stand expanded and admit of compression to regulate the gage of the cutter, and a screw fitted to the auxiliary cutter to close the same and limit the gage of the main cutter, substantially as and for the purposes described.

3. The combination with the die and the die stock, of the guide having its shanks lying between the die and the die stock and secured in place by means that clamps the die in place, substantially as and for the purposes described.

4. The combination with the die and the die stock, of the guide extending below the stock, swinging jaws pivoted opposite to each other on the guide, and means for securing said jaws, substantially as and for the purposes described.

5. The combination with the die stock and the guide, of the die having recesses formed at opposite corners to receive the shanks of the guide, one of said recesses having diverging or flaring sides at a split corner of the die, substantially as and for the purposes described.

In testimony whereof I affix my signature in presence of two witnesses.

MICHAEL ROUSE.

Witnesses:
HENRY MIDDENDORF,
JOHN WRIGHT.